US012625790B2

(12) United States Patent
Nishiyama

(10) Patent No.: US 12,625,790 B2
(45) Date of Patent: *May 12, 2026

(54) TRACING CIRCUIT, SEMICONDUCTOR DEVICE, TRACER, AND TRACING SYSTEM

(71) Applicant: ROHM CO., LTD., Kyoto (JP)

(72) Inventor: Takahiro Nishiyama, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/782,146

(22) Filed: Jul. 24, 2024

(65) Prior Publication Data

US 2024/0378126 A1     Nov. 14, 2024

Related U.S. Application Data

(63) Continuation of application No. 17/761,713, filed as application No. PCT/JP2020/039036 on Oct. 16, 2020, now Pat. No. 12,086,042.

(30) Foreign Application Priority Data

Oct. 18, 2019     (JP) ................................. 2019-191068

(51) Int. Cl.
*G06F 11/00*      (2006.01)
*G06F 1/10*       (2006.01)
*G06F 11/27*      (2006.01)

(52) U.S. Cl.
CPC ................ *G06F 11/27* (2013.01); *G06F 1/10* (2013.01)

(58) Field of Classification Search
None
See application file for complete search history.

(56) References Cited

U.S. PATENT DOCUMENTS 5,724,566 A     3/1998  Swoboda et al.
5,943,498 A     8/1999  Yano et al.
                (Continued)

FOREIGN PATENT DOCUMENTS

JP      S62200439       9/1987
JP      H07200349       8/1995
                (Continued)

OTHER PUBLICATIONS

Google Scholar/Patents search—text refined (Year: 2025).*
                (Continued)

*Primary Examiner* — Christopher S Mccarthy
(74) *Attorney, Agent, or Firm* — Fish & Richardson P.C.

(57)     ABSTRACT

A tracing circuit is integrated in a semiconductor device along with a microprocessor including an m-bit program counter, and externally outputs a tracing clock along with an n-bit tracing data (where $2 \leq n \leq m$). The tracing circuit, when the program counter remains unchanged, synchronously with the tracing clock sets the tracing data to a first output value; when the program counter is incremented, synchronously with the tracing clock sets the tracing data to a second output value; and when the program counter is loaded, synchronously with the tracing clock sets the tracing data to a third output value, and then suspends the state machine in the microprocessor and split-outputs, as the tracing data, the branch destination address or interrupt destination address loaded in the program counter.

10 Claims, 9 Drawing Sheets

(56) References Cited

U.S. PATENT DOCUMENTS

| | | | |
|---|---|---|---|
| 12,086,042 | B2 | 9/2024 | Nishiyama |
| 2004/0078690 | A1 | 4/2004 | Kohashi |
| 2005/0060523 | A1 | 3/2005 | Yamada et al. |
| 2005/0183062 | A1 | 8/2005 | Ubukata et al. |
| 2009/0222646 | A1 | 9/2009 | Ohba et al. |
| 2011/0113291 | A1 | 5/2011 | Ike |
| 2022/0391297 | A1 | 12/2022 | Nishiyama |

FOREIGN PATENT DOCUMENTS

| | | |
|---|---|---|
| JP | H08185336 | 7/1996 |
| JP | 2727947 | 3/1998 |
| JP | 2000172531 | 6/2000 |
| JP | 2000284985 | 10/2000 |
| JP | 2004199333 | 7/2004 |
| JP | 2005209172 | 8/2005 |
| JP | 3775462 | 5/2006 |
| JP | 2011100388 | 5/2011 |
| WO | WO 200193040 | 12/2001 |

OTHER PUBLICATIONS

JP OA—Japanese Patent Office, Office Action in Japanese Appln. No. 2024-077940, dated Feb. 18, 2025, 8 pages (with English translation).
CN OA—The State Intellectual Property Office of People's Republic of China, Office Action in Chinese Appln. No. 202080072402.6, dated Apr. 24, 2025, 16 pages (with machine translation).
Google Scholar/Patents search—text refined (Year: 2024).
International Search Report in International Appln. No. PCT/JP2020/039036, dated Dec. 1, 2020, 5 pages (with English Translation).

* cited by examiner

FIG. 7

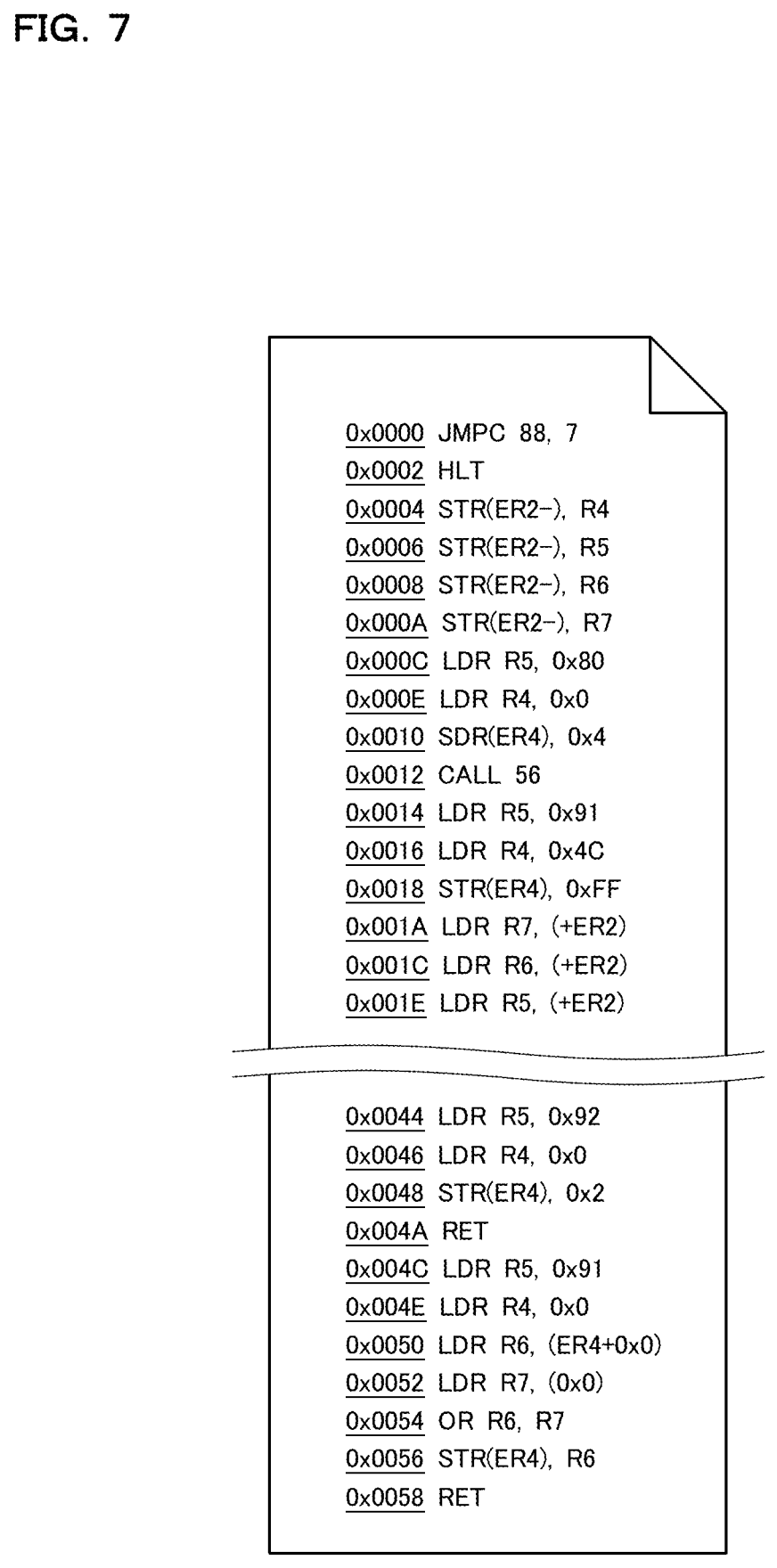

```
0x0000  JMPC 88, 7
0x0002  HLT
0x0004  STR(ER2-), R4
0x0006  STR(ER2-), R5
0x0008  STR(ER2-), R6
0x000A  STR(ER2-), R7
0x000C  LDR R5, 0x80
0x000E  LDR R4, 0x0
0x0010  SDR(ER4), 0x4
0x0012  CALL 56
0x0014  LDR R5, 0x91
0x0016  LDR R4, 0x4C
0x0018  STR(ER4), 0xFF
0x001A  LDR R7, (+ER2)
0x001C  LDR R6, (+ER2)
0x001E  LDR R5, (+ER2)

0x0044  LDR R5, 0x92
0x0046  LDR R4, 0x0
0x0048  STR(ER4), 0x2
0x004A  RET
0x004C  LDR R5, 0x91
0x004E  LDR R4, 0x0
0x0050  LDR R6, (ER4+0x0)
0x0052  LDR R7, (0x0)
0x0054  OR R6, R7
0x0056  STR(ER4), R6
0x0058  RET
```

FIG. 8

| trace_ counter | pc_count | |
|---|---|---|
| 0 | 0000 0000 0001 0100 | (14) |
| 1 | 0000 0000 0001 0100 | (14) |
| 2 | 0000 0000 0001 1100 | (1C) |
| 3 | 0000 0000 0000 1100 | (0C) |
| 4 | 0000 0000 0100 1100 | (4C) |
| 5 | 0000 0000 0100 1100 | (4C) |
| 6 | 0000 0000 0100 1100 | (4C) |
| 7 | 0000 0000 0100 1100 | (4C) |
| 8 | 0000 0000 0100 1100 | (4C) | trace_data

[1:0]="0 (00)"

[3:2]="3 (11)"

[5:4]="0 (00)"

[7:6]="1 (01)"

[9:8]="0 (00)"

[11:10]="0 (00)"

[13:12]="0 (00)"

[15:14]="0 (00)"

TRACING CIRCUIT, SEMICONDUCTOR DEVICE, TRACER, AND TRACING SYSTEM

CROSS-REFERENCE TO RELATED APPLICATIONS

This application is a continuation application of U.S. patent application Ser. No. 17/761,713 filed on Mar. 18, 2022, which is a U.S. National Phase application under 35 U.S.C. § 371 of International Patent Application No. PCT/JP2020/039036, filed Oct. 16, 2020, which claims priority to JP Application No. 2019-191068, filed Oct. 18, 2019, the contents of which are hereby incorporated by reference.

TECHNICAL FIELD

The invention disclosed herein relates to tracing circuits.

BACKGROUND ART

With an LSI incorporating a microprocessor (such as a CPU [central processing unit] that performs program operation, one often wishes to trace the program operation from outside the LSI, that is, to see how the program runs.

The purpose may vary, and can be to find the cause of the program failing to run as intended, or to check the code coverage of a program operation test (to check whether the test covers the entire code).

To meet such requirements, it is necessary to see how the CPU reads instruction codes in a program memory, in other words, to trace the read address in the program memory inside the CPU.

Examples of conventional technology related to what has been discussed above are seen in Patent Documents 1 and 2 identified below.

CITATION LIST

Patent Literature

Patent Document 1: Japanese Patent registered as No. 2727947, Description
Patent Document 2: Japanese Patent registered as No. 3775462, Description

SUMMARY OF INVENTION

Technical Problem

Inconveniently, according to Patent Document 1, a tracing storage means (tracing memory) needs to be provided inside the LSI, or alternatively all address buses need to be output to outside the LSI.

According to Patent Document 2, when a branching instruction is executed, only part of the relevant information is output to the outside, and thus deriving a branch destination address requires analysis outside the LSI. Failure to single out one branch destination address from a plurality of candidate ones makes tracing impossible.

In view of the above-mentioned problems encountered by the present inventor, an object of the invention disclosed herein is to provide a tracing circuit that allows easy and complete tracing of the read address in a program memory from outside a semiconductor device.

Solution to Problem

According to one aspect of what is disclosed herein, a tracing circuit is for integration in a semiconductor device along with a microprocessor including an m-bit program counter, and is configured to externally output a tracing clock along with an n-bit tracing data (where $2 \leq n \leq m$). The tracing circuit is configured such that, when the program counter remains unchanged, synchronously with the tracing clock, the tracing circuit sets the tracing data to a first output value; when the program counter is incremented, synchronously with the tracing clock, the tracing circuit sets tracing data to a second output value; and when the program counter is loaded, synchronously with the tracing clock, the tracing circuit sets the tracing data to a third output value, and then suspends the state machine in the microprocessor and split-outputs, as the tracing data, the branch destination address or interrupt destination address loaded in the program counter. (A first configuration.)

The tracing circuit of the first configuration described above may include: a status generator configured to generate a status signal that has the first output value when the program counter remains unchanged, has the second output value when the program counter is incremented, and has the third output value when the program counter is loaded; a counter configured to start operating when the status signal turns to the third output value and to stop operating when the split-output period for the branch destination address or interrupt destination address expires; and a selector configured to select the status signal as the tracing data when the counter is not operating and to select part of the branch destination address or interrupt destination address as the tracing data when the counter is operating. (A second configuration.)

In the tracing circuit of the second configuration described above, the status generator may be configured to generate the status signal by monitoring an internal control signal in the microprocessor. (A third configuration.)

In the tracing circuit of any of the first to third configurations described above, the tracing clock may be the driving clock for the microprocessor. (A fourth configuration.)

According to another aspect of what is disclosed herein, a semiconductor device has integrated therein: the tracing circuit according to any of the first to fourth configurations described above; and a microprocessor configured to read an instruction code from a program memory by using the output value of the program counter as a read address and to decode and execute the instruction code. (A fifth configuration.)

In the semiconductor device of the fifth configuration described above, the microprocessor may have a pipeline architecture. (A sixth configuration.)

According to yet another aspect of what is disclosed herein, a tracer is for external connection to the semiconductor device of the fifth or sixth configurations described above, and is configured to monitor the tracing data synchronously with the tracing clock to emulate the program counter and thereby output a tracing result of the read address. (A first configuration.)

The tracer of the seventh configuration described above may include: an emulated program counter; a decoder configured, when the tracing data is set to the first output value, to keep the emulated program counter unchanged, when the tracing data is set to the second output value, to increment the emulated program counter, and when the tracing data is set to the third output value, to load the emulated program counter sequentially with the branch destination address or interrupt destination address that is subsequently split-input; a latch configured to acquire as a definitive value the output value of the emulated program counter synchronously with the tracing clock except during the split-input period for the branch destination address or interrupt destination address; and a trace memory configured to store as the tracing result the definitive value that is sequentially acquired by the latch. (An eighth configuration.)

According to still another aspect of what is disclosed herein, a tracing system includes: the semiconductor device of the fifth or sixth configuration described above; the tracer of the seventh or eighths configuration described above; and a host configured to display, store, and analyze the tracing result. (A second configuration.)

According to a further aspect of what is disclosed herein, a tracing program is for execution on a computer to make the computer function as the host in the tracing system of the ninth configuration described above by making the input section, the display section, the storage section, and the processing section of the computer operate as means for receiving, displaying, storing, and analyzing the tracing result. (A tenth configuration.)

Advantageous Effects of Invention

With a tracing circuit according to what is disclosed herein, it is possible to easily and completely trace read addresses on a program memory from outside a semiconductor device.

BRIEF DESCRIPTION OF DRAWINGS

FIG. 7 is a diagram showing one example of program code;

FIG. 8 is a diagram showing split-input operation for a branch destination address.

DESCRIPTION OF EMBODIMENTS

<Tracing System>

Figure 1:
FIG. 1 is a diagram showing an overall configuration of a tracing system.
Figure 1:
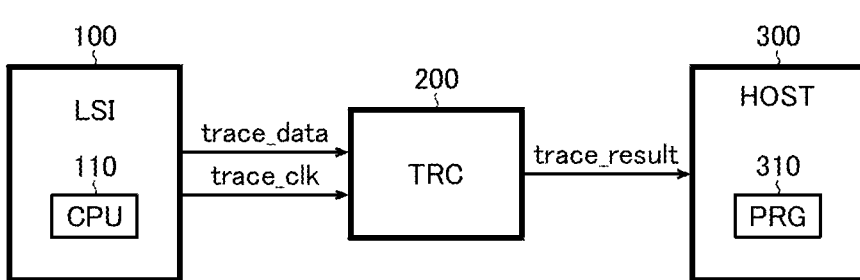

FIG. 1 is a diagram showing the overall configuration of a tracing system. The tracing system X of this configuration example includes an LSI 100, a tracer 200, and a host 300.

The LSI 100 is one example of a semiconductor device that incorporates a CPU 110. For easy and complete tracing of the program operation (i.e., the read address in a program memory) of the CPU 110 from the outside, the LSI 100 is provided with a function of externally outputting one tracing clock "trace_clk" along with, synchronously with it, n-bit (e.g., n=2) tracing data "trace_data" (described in detail later).

The tracer 200 is one example of an adaptor (debugging tool) that is externally connected to the LSI 100. The tracer 200, by monitoring the tracing data "trace_data" synchronously with the tracing clock "trace_clk" and emulating the program counter inside the CPU 110, acquires the tracing result "trace_result" of the above-mentioned read address (i.e., the result of tracing the read address) and outputs it to the host 300 (described in detail later). Communication between the tracer 200 and the host 300 can be achieved suitably via USB (universal serial bus) or the like.

The host 300 receives from the tracer 200 the tracing result "trace_result", and displays, stores, analyzes, and otherwise processes it. For example, in a case where a personal computer is used as the host 300, a tracing program 310 to be run on the personal computer is previously prepared, and the relevant sections of the personal computer, i.e., the input section (such as an USB port), the display section (such as an LCD [liquid crystal display]), the storage section (such as an HDD [hard disc drive] or SSD [solid-state drive]), and the processing section (such as CPU and a DSP [digital signal processor]), can be utilized respectively as means for receiving, displaying, storing, and analyzing the tracing result "trace_result".

It is preferable that the tracer 200 and the tracing program 310 be provided along with the LSI 100.

<LSI>

Figure 2:
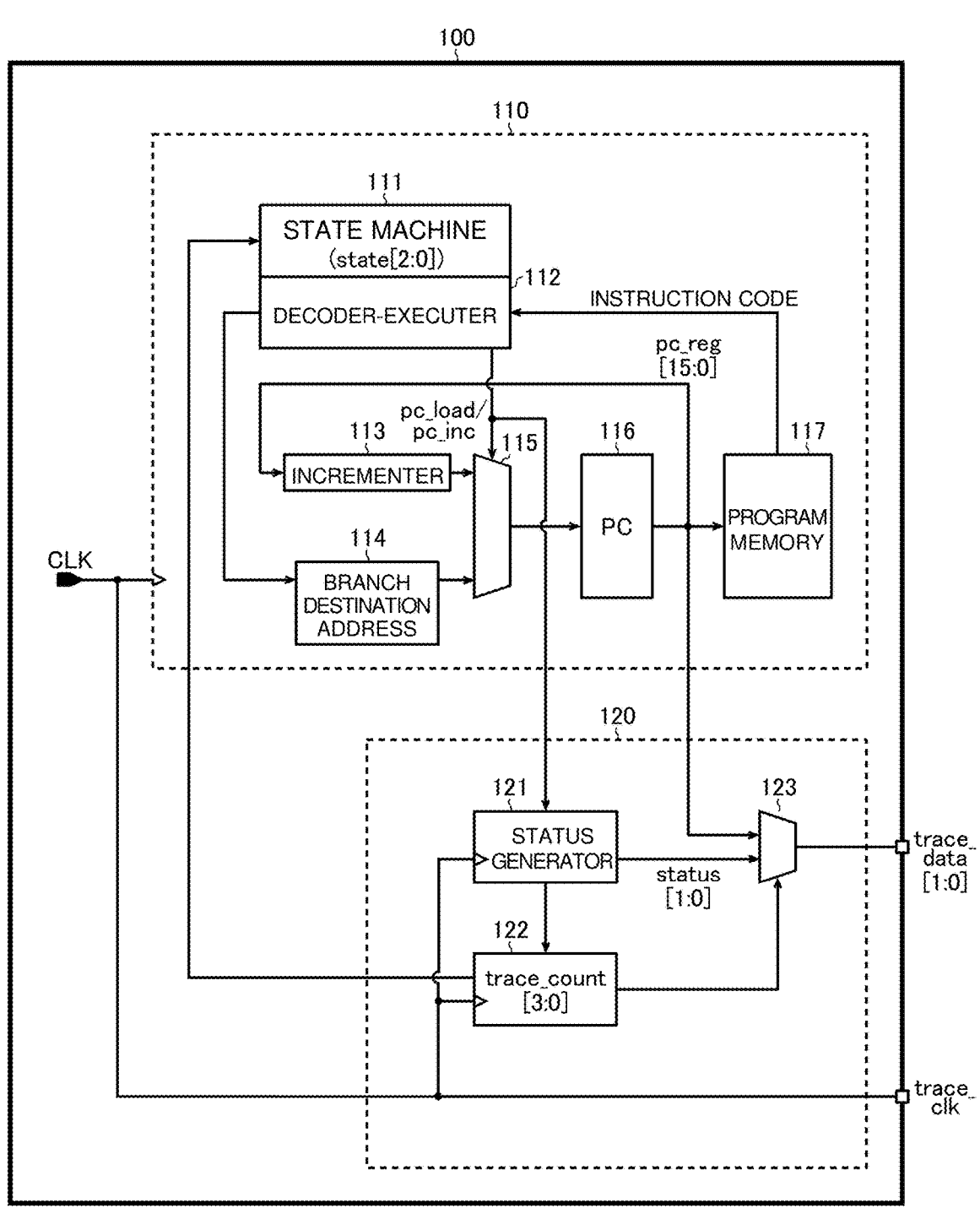
FIG. 2 is a diagram showing one configuration example of an LSI.

FIG. 2 is a diagram showing one configuration example of the LSI 100. The LSI 100 of this configuration example has, along with the CPU 110 mentioned above, a tracing circuit 120 integrated in it.

The CPU 110 is one example of a microprocessor that performs program operation synchronously with a driving clock CLK (e.g., 100 MHz). The LSI 100 includes a state machine 111, a decoder-executer 112, an incrementer 113, a branch destination address storage 114, a selector 115, a program counter (PC) 116, and a program memory 117.

The state machine 111 is a 3-bit sequential circuit (logic circuit) that governs the state transition of the CPU 110, and can take one of eight operation states at the maximum (such as FETCH, WAIT_KEEP, TRACE, and PRE_FETCH). The TRACE state is one of the states newly introduced with the implementation of the tracing circuit 120. As will be described in detail later, while the tracing circuit 120 is split-outputting the branch destination address or interrupt destination address loaded in the program counter 116, the state machine 111 is suspended in the TRACE state.

The decoder-executer 112 reads instruction codes from the program memory 117 by using the output value "pc_reg" of the program counter 116 as the read address, and decodes and executes those instruction codes.

The incrementer 113 increments the output value "pc_reg" of the program counter 116 by a predetermined increment value and outputs the result.

The branch destination address storage 114 holds the branch destination address or interrupt destination address output from the decoder-executer 112 when it is loaded in the program counter 116.

The selector 115 outputs either the output of the incrementer 113 or the output of the branch destination address storage 114 selectively to the program counter 116 in accordance with internal control signals (e.g., a PC load instruction "pc_load" and a PC increment instruction "pc_inc") output from the decoder-executer 112.

For example, when pc_inc="H" (the logic level for a PC increment), the output of the incrementer 113 is selectively output to the program counter 116. As a result, in a configuration where the CPU 110 has a pipeline architecture, concurrently with the decoding and execution of an instruction code, the program counter 116 is incremented. Or, in a configuration where the CPU 110 does not have a pipeline architecture, after the decoding and execution of an instruction code, the program counter 116 is incremented.

By contrast, when pc_load="H" (the logic level for a PC load), the output of the branch destination address storage 114 is selectively output to the program counter 116. Accordingly, for example, in a case where the state pc_load="H" results from execution of any of an interrupt instruction NMI (non-maskable interrupt) and an IRQ (interrupt request); a jump instruction JMP (absolute or relative); a subroutine call instruction CALL; and return instructions RET and RETI, then a branch destination address or interrupt destination address is loaded in the program counter 116.

The program counter 116 is an m-bit (e.g., m=16) register that operates synchronously with the driving clock CLK. The output value "pc_reg" of the program counter 116 is used as the read address in the program memory 117.

The program memory 117 is a means for storage of instruction codes for the CPU 110. The instruction code read in accordance with the read address (pc_reg) is decoded and executed by the decoder-executer 112 mentioned above.

The tracing circuit 120 is a novel functional block that externally outputs to the tracer 200 one tracing clock "trace_clk" along with, synchronously with it, n-bit tracing data "trace_data" (where 2≤n≤m; e.g., n=2). The tracing circuit 120 includes a status generator 121, a counter 122, and a selector 123.

As the tracing clock "trace_clk" mentioned above, the driving clock CLK for the CPU 110 can be used as it is.

The status generator 121 operates synchronously with the tracing clock "trace_clk", The status generator 121 monitors internal control signals (e.g., a PC load instruction "pc_load" and a PC increment instruction "pc_inc") in the CPU 110 and generates a 2-bit status signal "status".

Specifically, the status signal "status" has a first output value "0d (00b)" when the program counter 116 remains unchanged (pc_load="L" and pc_inc="L"), has a second output value "1d (01b)" when the program counter 116 is incremented (pc_inc="H"), and has a third output value "2d (10b)" when the program counter 116 is loaded (pc_load="H). As for a fourth output value "3d (11b)" of the status signal "status", it can be reserved as a reserved value (unused value).

The counter 122 is a 4-bit pulse counter. The counter 122 starts pulse counting operation for the tracing clock "trace_clk" (i.e., starts counting it) when the status signal "status" turns to the third output value "2d (10b)", that is, when the program counter 116 is loaded (i.e., when an address is loaded in the program counter 116). The counter 122 ends pulse counting operation and resets its count value "trace_count" to zero when the count value "trace_count" reaches a predetermined value (e.g., 8d (1000b), that is, when the split-output period (described in detail later) for the branch destination address or interrupt destination address expires.

The selector 123 selects either the status signal "status" or the output value "pc_reg" (n bits of it at the maximum) of the program counter 116 in accordance with the operation state of the counter 122 (in accordance with whether the count value "trace_count" equals zero), and outputs it as the tracing data "trace_data".

Specifically, with the counter 122 suspended, that is, not operating (trace_count=0), the status signal "status" is output as the tracing data "trace_data". By contrast, with the counter 122 operating (trace_count≠0), the output value "pc_reg" of the program counter 116 (i.e., part of the branch destination address or interruption destination address) is sequentially output as the tracing data "trace_data".

For complete output of the branch destination address or interrupt destination address as the tracing data "trace_data", it is preferable that, with the counter 122 operating (trace_count≠0), the state machine 111 in the CPU 110 be kept in a suspended state (TRACE state).

With the tracing circuit 120 configured as described above, it is possible to achieve the following operation with an extremely simple circuit configuration: when the program counter 116 remains unchanged, synchronously with the tracing clock "trace_clk", the tracing data "trace_data" is set to the first output value "0d (00b)"; when the program counter 116 is incremented, synchronously with the tracing clock "trace_clk", the tracing data "trace_data" is set to the second output value "1d (01b)"; when the program counter 116 is loaded, synchronously with the tracing clock "trace_clk", the tracing data "trace_data" is set to the third output value "2d (10b)", and then, with the state machine 111 in the CPU 110 suspended, the branch destination address or interrupt destination address loaded in the program counter 116 is split-output as the tracing data "trace_data". This will be described in detail below with reference to a flow chart.

<Tracing Operation (in the LSI)>

Figure 3:
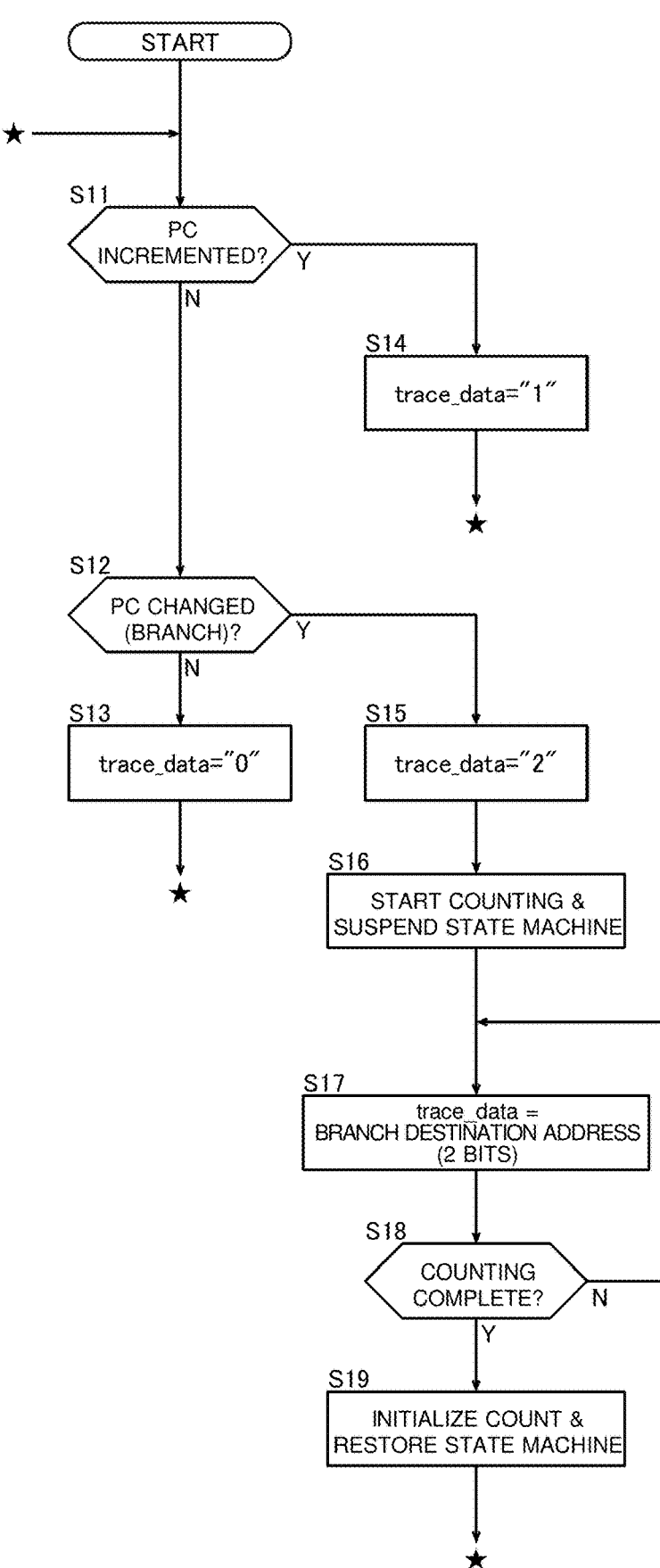
FIG. 3 is a diagram showing one example of tracing operation (LSI)

FIG. 3 is a flow chart showing one example of the tracing operation in the LSI 100 (the tracing circuit 120 in particular). When the tracing operation starts, at step S11, it is checked whether the program counter 116 has been incremented (whether pc_inc="H"). If the check result is "No", the flow proceeds to step S12; if the check result is "Yes", the flow proceeds to step S14.

When the check result of step S11 is "No", then at step S12 it is checked whether the program counter 116 has been changed (whether a branch or interrupt has occurred; whether pc_load="H"). Here, if the check result is "No", the flow proceeds to step S13; if the check result is "Yes", the flow proceeds to step S15.

When the check result of step S12 is "No", then the tracer 200 needs to be informed that the program counter 116 has remained unchanged. Accordingly, at step S13, the tracing data "trace_data" is set to the first output value "0d (00b)". The flow then returns to step S11.

By contrast, when the check result of step S11 is "Yes", then the tracer 200 needs to be informed that the program counter 116 has been incremented. Accordingly, at step S14, the tracing data "trace_data" is set to the second output value "1d (01b)". The flow then returns to step S11.

On the other hand, when the check result of step S12 is "Yes", then the tracer 200 needs to be informed that the program counter 116 has been loaded. Accordingly, at step S15, the tracing data "trace_data" is set to the third output value "2d (10b)".

Moreover, when the program counter 116 has been loaded, the tracer 200 needs to be informed of the branch destination address or interrupt destination address. Accordingly, at the subsequent steps S16 to S18, split-output of the branch destination address or interrupt destination address is performed (i.e., the address is split-output).

Specifically, first, at step S16, the counter 122 starts pulse counting operation with the tracing clock "trace_clk", and also the state machine 111 in the CPU 110 is brought into a suspended state (TRACE state).

Subsequently, at step S17, synchronously with the tracing clock "trace_clk", part of the branch destination address or interrupt destination address is split-output as the tracing data "trace_data".

Subsequently, at step S18, it is checked whether the count value "trace_count" of the counter 122 has reached a predetermined value, that is, whether the counting of the split-output period has ended.

For example, in a configuration where the output value "pc_reg" of the program counter 116 (i.e., the branch destination address or interrupt destination address) is sixteen bits wide, and the tracing data "trace_data" is two bits wide, outputting all the bit values of the branch destination address or interrupt destination address requires at least eight pulses of the tracing clock "trace_clk".

If the check result of step S18 is "No", the flow returns to step S17, where split-output of the branch destination address or interrupt destination address is continued. By contrast, if the check result is "Yes", the flow proceeds to step S19.

At step S19, the count value "trace_count" of the counter 122 is reset to zero, and the state machine 111 in the CPU 110 is restored from the suspended state (TRACE state). The flow then returns to step S11, and the sequence of operation described above is repeated.

<Tracer>

Figure 4:
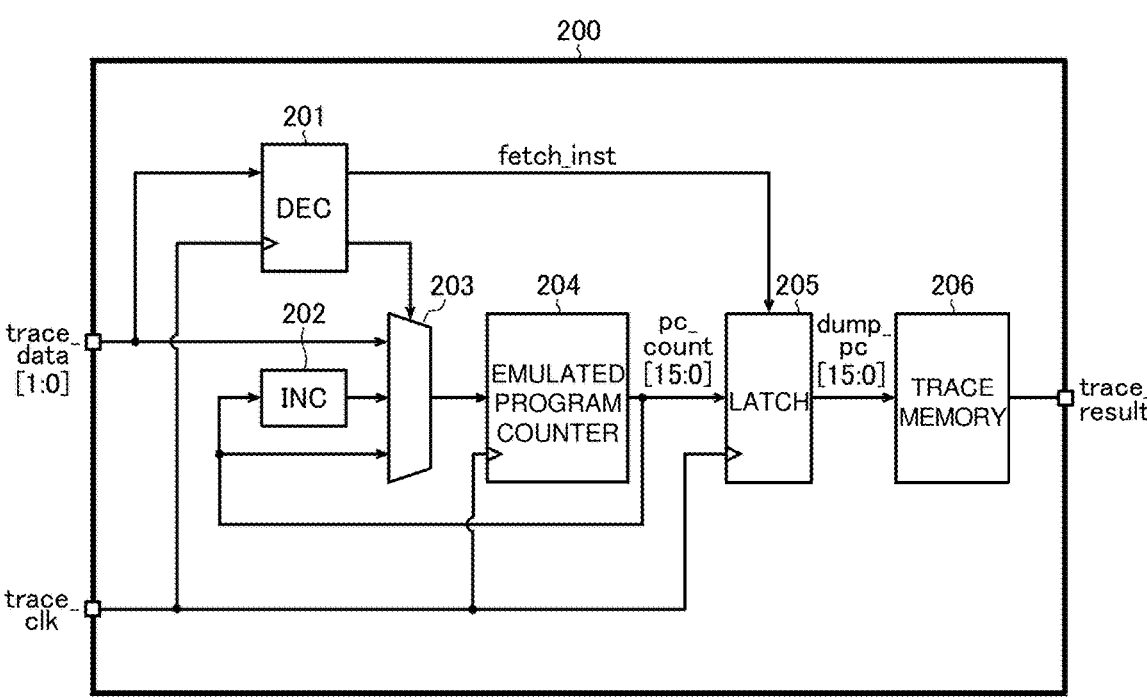
FIG. 4 is a diagram showing one configuration example of a tracer.

FIG. 4 is a diagram showing one configuration example of the tracer 200. The tracer 200 of this configuration example includes a decoder 201, an incrementer 202, a selector 203, an emulated program counter 204, a latch 205, and a trace memory 206.

The decoder 201 monitors the tracing data "trace_data" synchronously with the tracing clock "trace_clk", and controls the individual blocks (such as the selector 203 and the latch 205) of the tracer 200.

Specifically, when the tracing data "trace_data" is the first output value "0d (00b)", the decoder 201 keeps the emulated program counter 204 unchanged; when the tracing data "trace_data" is the second output value, the decoder 201 increments the emulated program counter 204; when the tracing data "trace_data" is the third output value "2d (10b)", the decoder 201 controls the selector 203 such that the branch destination address or interrupt destination address that is subsequently split-input is sequentially loaded in the emulated program counter 204.

The decoder 201 also generates a definitive value acquisition instruction signal "fetch_inst" based on the result of the monitoring of the tracing data "trace_data", and controls whether to acquire via the latch 205 the output value "pc_count" of the emulated program counter 204 as an emulated PC definitive value "dump_pc".

The incrementer 202 increments the output value "pc_count" of the emulated program counter 204 by a predetermined increment value and outputs the result.

The selector 203 outputs to the emulated program counter 204 selectively either the output value of the incrementer 113 or the output value "pc_count" of the emulated program counter 204.

Specifically, when the tracing data "trace_data" is the first output value "0d (00b)", so that the emulated program counter 204 will remain unchanged, the output value "pc_count" of the emulated program counter 204 is selectively output to the emulated program counter 204. It is also possible to keep the emulated program counter 204 unchanged by inhibiting the fetch operation of the emulated program counter 204.

By contrast, when the tracing data "trace_data" is the second output value "1d (01b)", so that the emulated program counter 204 will be incremented, the output value of the incrementer 113 is selectively output to the emulated program counter 204.

On the other hand, when the tracing data "trace_data" is the third output value "2d (10b)", so that the branch destination address or interrupt destination address that is subsequently split-input will be sequentially stored in the emulated program counter 204, the tracing data "trace_data" is selectively output to the emulated program counter 204.

The emulated program counter 204 is an m-bit (e.g., m=16) resister that operates synchronously with the tracing clock "trace_clk", and emulates the program counter 116 in the CPU 110.

The latch 205 acquires as the emulated PC definitive value "dump_pc" the output value "pc_count" of the emulated program counter 204 synchronously with the tracing clock "trace_clk" except during the split-input period (described in detail later) of the branch destination address or interrupt destination address. Whether to operate the latch 205 is determined based on the definitive value acquisition instruction signal "fetch_inst". Specifically, when fetch_inst="H", the latch operation is permitted; when fetch_inst="L", the latch operation is inhibited.

The trace memory 206 stores as a tracing result "trace_result" the emulated PC definitive value "dump_pc" that is sequentially acquired by the latch 205. Instead, the tracing result "trace_result" may be output as necessary in response to a request from the host 300, or may be output regularly every time a predetermined amount of data is buffered.

With the configuration described above where, from the LSI 100 (the tracing circuit 120 in particular), one tracing clock "trace_clk" along with n-bit (e.g., n=2) tracing data "trace_data" synchronous with it are externally output and, by use of the tracer 200 externally connected to the LSI 100, the program counter 116 in the CPU 110 is emulated, there is no need to implement a trace memory in the LSI 100. It is thus possible to easily and completely trace the program operation of (the read address in) the CPU 110 with only a small number of pins without an increase in the overhead on the LSI 100.

It can be said that, for the tracing of the program operation of the CPU 110 that operates synchronously with a fast driving clock CLK (e.g., 100 MHz), hardware processing is indispensable on the tracer 200 that operates synchronously with the tracing clock "trace_clk" (i.e., the driving clock CLK).

<Tracing Operation (in the Tracer)>

Figure 5:
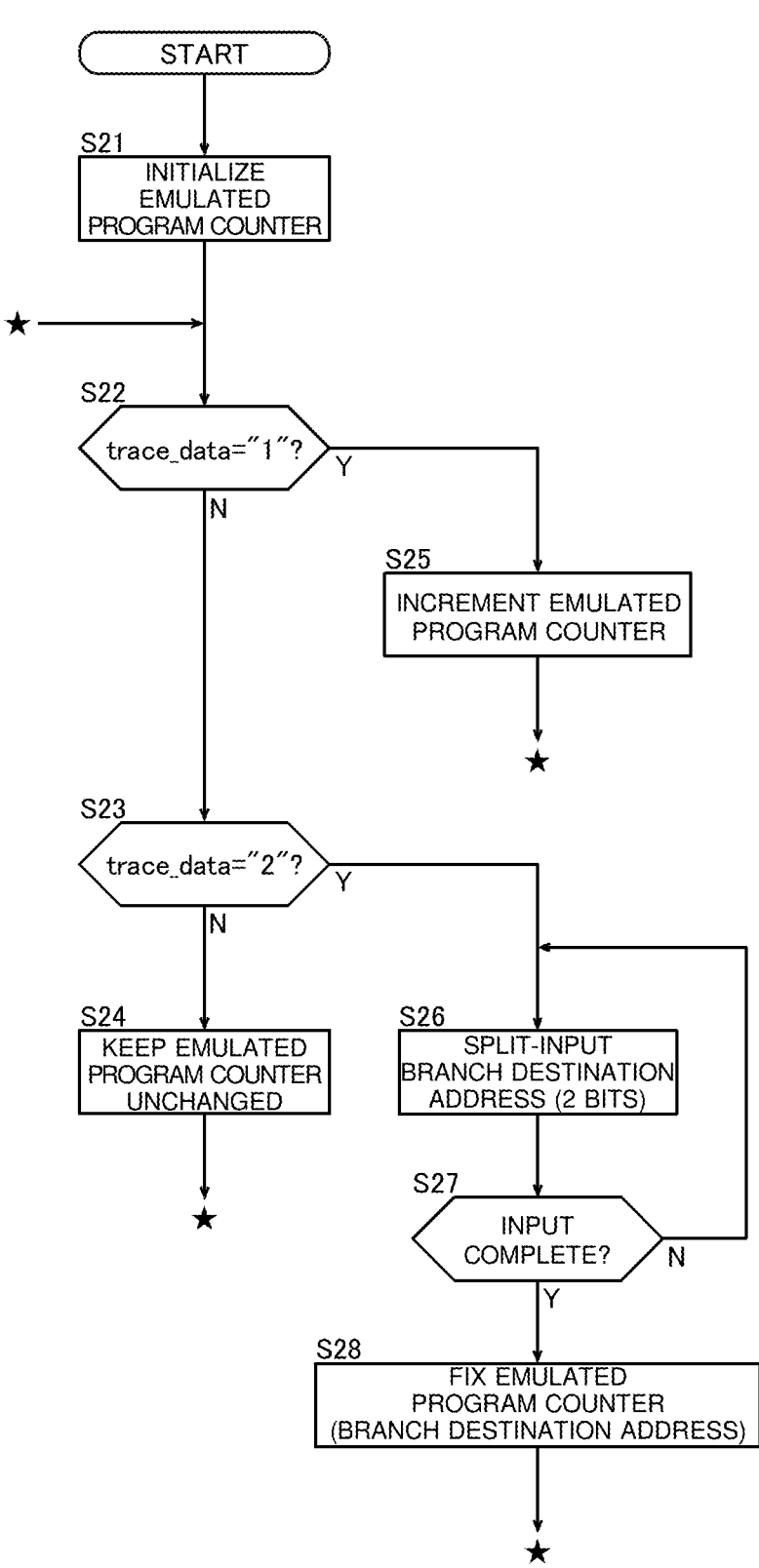
FIG. 5 is a diagram showing one example of tracing operation (tracer)

FIG. 5 is a flow chart showing one example of the tracing operation in the tracer 200. When the tracing operation starts, first, at step S21, the output value "pc_count" of the emulated program counter 204 is initialized.

For example, when tracing is started at the beginning of a program, considering that the output value "pc_reg" of the program counter 116 starts with zero, the output value "pc_count" of the emulated program counter 204 can also be initialized to zero. On the other hand, when tracing is started mid-program, program operation has to be interrupted at the address at which tracing is desired to be started, and after program operation is restarted, tracing data can be recorded; accordingly the output value "pc_count" of the emulated program counter 204 can be initialized to the above-mentioned address at which program operation is interrupted.

Subsequently, at step S22, it is checked whether the tracing data "trace_data" input from the LSI 100 is the second output value "1d (01b)". If the check result is "No", the flow proceeds to step S23; if the check result is "Yes", the flow proceeds to step S25.

When the check result of step S22 is "No", then at step S23 it is checked whether the tracing data "trace_data" input from the LSI 100 is the third output value "2d (10b)". If the check result is "No", the flow proceeds to step S24; if the check result is "Yes", the flow proceeds to step S26.

When the check result of step S23 is "No", the tracing data "trace_data" input from the LSI 100 is considered to be the first output value "0d (00b)". Accordingly, at step S24, the emulated program counter 204 is kept unchanged, and the flow then returns to step S22.

By contrast, when the check result of step S22 is "Yes", then at step S25 the emulated program counter 204 is incremented, and the flow then returns to step S22.

On the other hand, when the check result of step S23 is "Yes", the branch destination address or interrupt destination address needs to be loaded in the emulated program counter 204. Accordingly, at steps S26 and S27, split-input of the branch destination address or interrupt destination address is performed.

Specifically, first, at step S26, part (two bits) of the branch destination address or interrupt destination address that is split-input as the tracing data "trace_data" is stored at the corresponding bits in the emulated program counter 204.

Subsequently, at step S27, it is checked whether all the bit values of the branch destination address or interrupt destination address have been stored in the emulated program counter 204. That is, it is checked whether split-input of the branch destination address or interrupt destination address is complete.

If the check result of the step S27 is "No", the flow returns to step S26, where split-input of the branch destination address or interrupt destination address is continued. By contrast, if the check result is "Yes", the flow proceeds to step S28.

At step S28, the output value "pc_count" of the emulated program counter 204 is fixed as the emulated PC definitive value "dump_pc". After that, the flow returns to step S22, and the sequence of operation described above is repeated.
<Tracing Operation (in the Entire System)>

Figure 6:
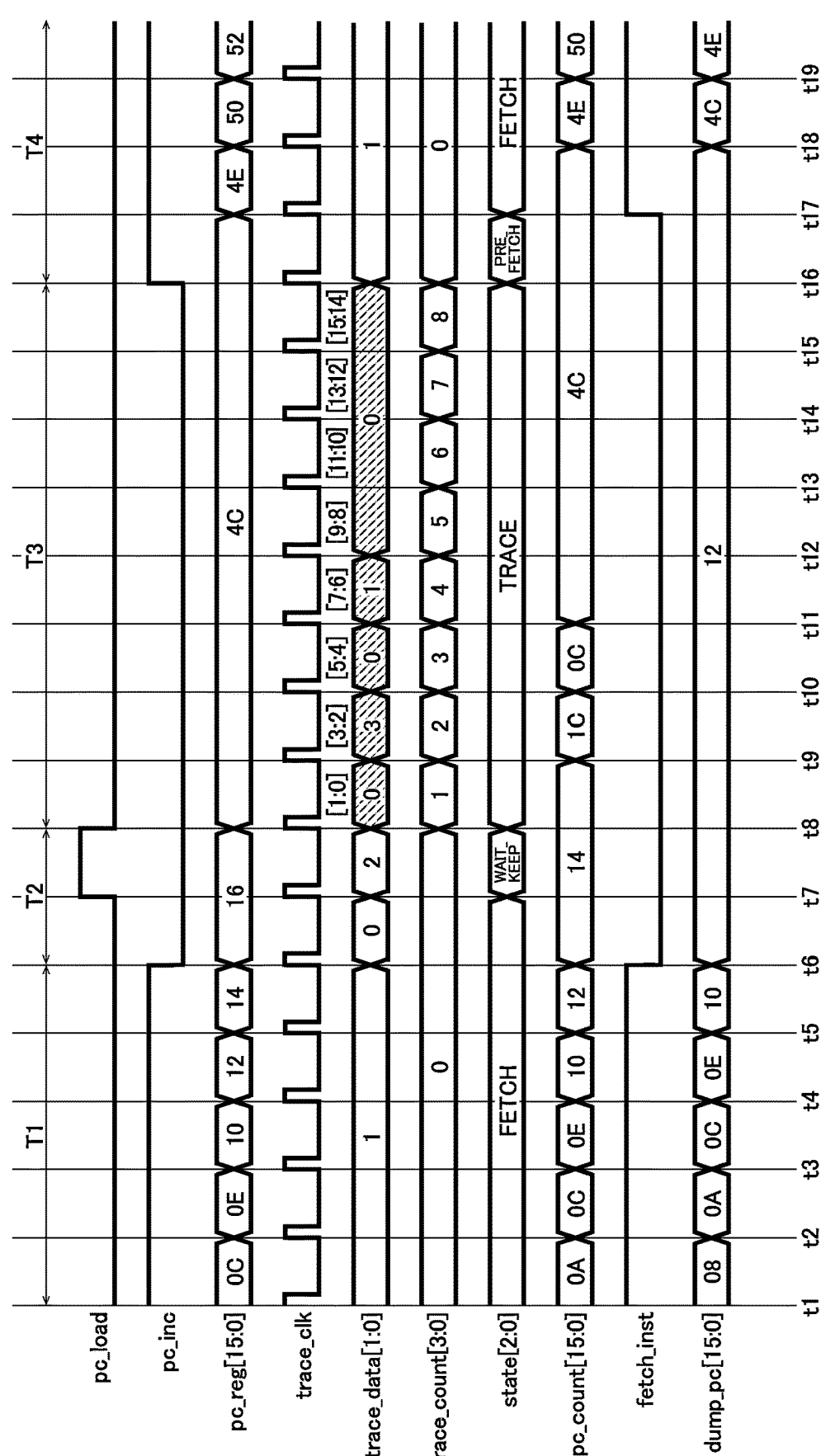
FIG. 6 is a diagram showing one example of tracing operation (entire system)

FIG. 6 is a timing chart showing one specific example of the tracing operation in the entire tracing system X, depicting, from the top down, the PC load instruction "pc_load", the PC increment instruction "pc_inc", the output value "pc_reg" of the program counter 116, the tracing clock "trace_clk", the tracing data "trace_data", the count value "trace_count" of the counter 122, the operation state "status" of the state machine 111, the output value "pc_count" of the emulated program counter 204, the definitive value acquisition instruction signal "fetch_inst", and the emulated PC definitive value "dump_pc".

FIG. 6 assumes a configuration where the CPU 110 has a three-stage pipeline architecture. That is, in the CPU 110, signal processing for one instruction code is broken up into three units of signal processing (fetch [F], decode [D], and execute [E]), and these proceed independently and concurrently. The pipeline architecture may have two stages, or may have four or more stages. Needless to say, the CPU 110 does not necessarily need to have a pipeline architecture.

FIG. 6 assumes that the CPU 110 is an 8-bit CPU and the instruction codes are 16 bits wide. This however is not meant to limit the number of bits processed by the CPU 110 or the number of bits per instruction code.

FIG. 7 is a diagram showing one example (an excerpt) of program code for the tracing operation in FIG. 6. In the program code shown as an example there, various instructions (such as JMPC, HLT, STR, LDR, SDR, CALL, RET, and OR) are stored one at each of addresses 0x0000 to 0x0058.

A detailed description will be given below, with reference to FIGS. 6 and 7 as necessary, of the tracing operation in the entire tracing system X, for each of four roughly divided periods T1 to T4.

First, attention is paid to period T1 (between time points t1 and t6). In period T1, pc_load="L and pc_inc="H".

Accordingly, the output value "pc_reg" of the program counter 116 keeps being incremented by "+2" at a time (0C to 0E to 10 to 12 to 14 to 16) synchronously with the tracing clock "trace_clk" (i.e., the driving clock CLK).

The reason that the increment value for the program counter 116 is "+2" is that, owing to the CPU 110 being an 8-bit CPU and the instruction codes being 16 bits wide, the read address in the program memory 117 is incremented by two bytes at a time. In this way, the increment value for the program counter 116 is determined in accordance with the number of bits processed by the CPU 110 and the number of bits per instruction code.

As mentioned above, the CPU 110 has a three-stage pipeline architecture. Accordingly, the LDR instruction at address 0x000C that is fetched at time point t1 is decoded at time point t2 and is executed at time point t3. Any other instruction is processed basically likewise. When a branch instruction or interrupt instruction is executed, however, an instruction that is fetched or decoded concurrently may be discarded without being executed. Needless to say, this does not apply with a CPU that does not have a pipeline architecture or one with deeper-stage pipelines.

In period T1, the tracing data "trace_data" is the second output value "1" (PC increment). In this state, the counter 122 is inactive (trace_count=0), and the operation state "state" of the state machine 111 is the FETCH state.

In period T1, the output value "pc_count" of the emulated program counter 204 is incremented by "+2" at a time (0A to 0C to 0E to 10 to 12 to 14) with a delay of one clock from the output value "pc_reg" of the program counter 116.

In period T1, fetch_inst="H". Accordingly, the emulated PC definitive value "dump_pc" is incremented by "+2" at a time (08 to 0A to 0C to 0E to 10 to 12) with a delay of one clock from the output value "pc_count" of the emulated program counter 204.

Next, attention is paid to period T2 (between time points t6 and t8). When, at time point t6, the CALL instruction at address 0x0012 (a branch instruction for calling a subroutine) is executed, then pc_inc="L", and subsequently, at time point t7, pc_inc="L"; further subsequently, at time point t8, the branch destination address 0x004C is fetched as the output value "pc_reg" of the program counter 116. Meanwhile, the tracing data "trace_data" changes from the second output value "1" (PC increment), which it has up to then been, to the first output value "0" (PC no change), and then to the third output value "2" (PC change [branch]). Also the operation state "state" of the state machine 111 changes from the FETCH state to the WAIT_KEEP state.

In period T2, the output value "pc_count" of the emulated program counter 204 remains unchanged (holding "14", which it has up to then had). Furthermore, fetch_inst="L", and thus also the emulated PC definitive value "dump_pc" remains unchanged (holding "12, which it has up to then had).

Next, attention is paid to period T3 (between time points t8 to t16). When the tracing data "trace_data" changes to the third output value "2" (PC change [branch]), then, starting at the next cycle, split-output of the branch destination address is started.

Specifically, at time point 8, pulse counting operation (the counting up of the count value "trace_count") by the counter 122 is started, and while this pulse counting operation is continued, synchronously with the tracing clock "trace_clk", the branch destination address 0x004C is split-output two bits at the time as the tracing data "trace_data" (see the hatched area in FIG. 6).

For example, in a configuration where the output value "pc_reg" of the program counter 116 (i.e., the branch destination address or interrupt destination address) is 16 bits wide, and the tracing data "trace_data" is two bits wide, outputting all the bit values of the branch destination address or interrupt destination address requires at least eight pulses of the tracing clock "trace_clk". For the sake of discussion, if the tracing data "trace_data" is expanded to four bits, four pulses suffice; if the tracing data "trace_data" is expanded to eight bits, two pulses suffice; and if the tracing data "trace_data" is expanded to 16 bits (i.e., n=m), one pulses suffices.

Here, to ensure complete output of all the bit values of the branch destination address 0x004C, the operation state "state" of the state machine 111 is changed to the TRACE state (suspended state).

On the other hand, in the emulated program counter 204, the branch destination address 0x004C that is split-input two bits at a time as the tracing data "trace_data" is sequentially stored.

FIG. 8 is a diagram showing the split-input operation for a branch destination address, depicting, from the top down, the transition of the count value "trace_counter" of the counter 122, the transition of the output value "pc_count" of the emulated program counter 204, and the transition of the tracing data "trace_data". A description will now be given, with reference also to FIG. 6 referred to above, of the split-input operation for the branch destination address 0x004C (=0000 0000 0100 1100).

When trace_counter="0", pc_counter="0000 0000 0001 0100 (0x0014)" (see time point t7 in FIG. 6).

When trace_counter="1", of the 16-bit branch destination address 0x004C, the first and second bit values ([1:0]="0d (00b)") are, as 2-bit tracing data "trace_data", set as the first and second bit values in the emulated program counter 204. As a result, pc_counter="0000 0000 0001 0100b (0x0014)" (see time point t8 in FIG. 6).

When trace_counter="2", of the 16-bit branch destination address 0x004C, the third and fourth bit values ([3:2]="3d (11b)") are, as 2-bit tracing data "trace_data", set as the third and fourth bit values in the emulated program counter 204. As a result, pc_counter="0000 0000 0001 1100b (0x001C)" (see time point t9 in FIG. 6).

When trace_counter="3", of the 16-bit branch destination address 0x004C, the fifth and sixth bit values ([5:4]="0d (00b)") are, as 2-bit tracing data "trace_data", set as the fifth and sixth bit values in the emulated program counter 204. As a result, pc_counter="0000 0000 0000 1100b (0x000C)" (see time point t10 in FIG. 6).

When trace_counter="4", of the 16-bit branch destination address 0x004C, the seventh and eighth bit values ([7:6]="1d (01b)") are, as 2-bit tracing data "trace_data", set as the seventh and eighth bit values in the emulated program counter 204. As a result, pc_counter="0000 0000 0100 1100b (0x004C)" (see time point t11 in FIG. 6).

When trace_counter="5", of the 16-bit branch destination address 0x004C, the ninth and tenth bit values ([9:8]="0d (00b)") are, as 2-bit tracing data "trace_data", set as the ninth and tenth bit values in the emulated program counter 204. As a result, pc_counter="0000 0000 0100 1100b (0x004C)" (see time point t12 in FIG. 6).

When trace_counter="6", of the 16-bit branch destination address 0x004C, the eleventh and twelfth bit values ([11:10]="0d (00b)") are, as 2-bit tracing data "trace_data", set as the eleventh and twelfth bit values in the emulated program counter 204. As a result, pc_counter="0000 0000 0100 1100b (0x004C)" (see time point t13 in FIG. 6).

When trace_counter="7", of the 16-bit branch destination address 0x004C, the thirteenth and fourteenth bit values ([13:12]="0d (00b)") are, as 2-bit tracing data "trace_data", set as the thirteenth and fourteenth bit values in the emulated program counter 204. As a result, pc_counter="0000 0000 0100 1100b (0x004C)" (see time point t14 in FIG. 6).

When trace_counter="8", of the 16-bit branch destination address 0x004C, the fifteenth and sixteenth bit values ([15:14]="0d (00b)") are, as 2-bit tracing data "trace_data", set as the fifteenth and sixteenth bit values in the emulated program counter 204. As a result, pc_counter="0000 0000 0100 1100b (0x004C)" (see time point t15 in FIG. 6).

In this way, the 16-bit branch destination address 0x004C is split-input, two bits at each of eight times, to the emulated program counter 204.

Referring back to FIG. 6, now with attention paid to period T4 (i.e., between time points t16 to t19), the detailed description of the tracing operation will continue.

At time point t16, on completion of split-input of the branch destination address 0x004C, the count value "trace_count" of the counter 122 resets to zero, and the state machine 111 recovers from the TRACE state (suspended state) via the PRE_FETCH state to the FETCH state.

At time point t16, in response to the LDR instruction for the branch destination address 0x004C being decoded, pc_inc="H". Accordingly, starting with the next cycle, the output value "pc_reg" of the program counter 116 is kept being incremented by "+2" at a time (4C to 4E to 50 to 52 . . . ) synchronously with the tracing clock "trace_clk" (i.e., the driving clock CLK).

In period T4, the tracing data "trace_data" is the second output value "1" (PC increment). Accordingly, the output value "pc_count" of the emulated program counter 204 is, from the branch destination address 0x004C written during period T3, kept being incremented by "+2" at a time (4C to 4E to 50 . . . ).

In period T4, when trace_data="1" (PC increment) for two consecutive cycles, then fetch_inst="H", and the output value "pc_count (=0x004C)" of the emulated program counter 204 is latched as the emulated PC definitive value "dump_pc". After that, the emulated PC definitive value "dump_pc" is kept being incremented by "+2" at a time (4C to 4E . . . ) with a delay of one clock from the output value "pc_count" of the emulated program counter 204.

The reason that, when trace_data="1" (PC increment) for two consecutive cycles, the output value "pc_count" of the emulated program counter 204 is fixed as the emulated PC definitive value "dump_pc" is that, owing to the CPU 110 having a three-stage pipeline architecture, only when two PC increments occur consecutively is the read instruction code executed.

Figure 9:
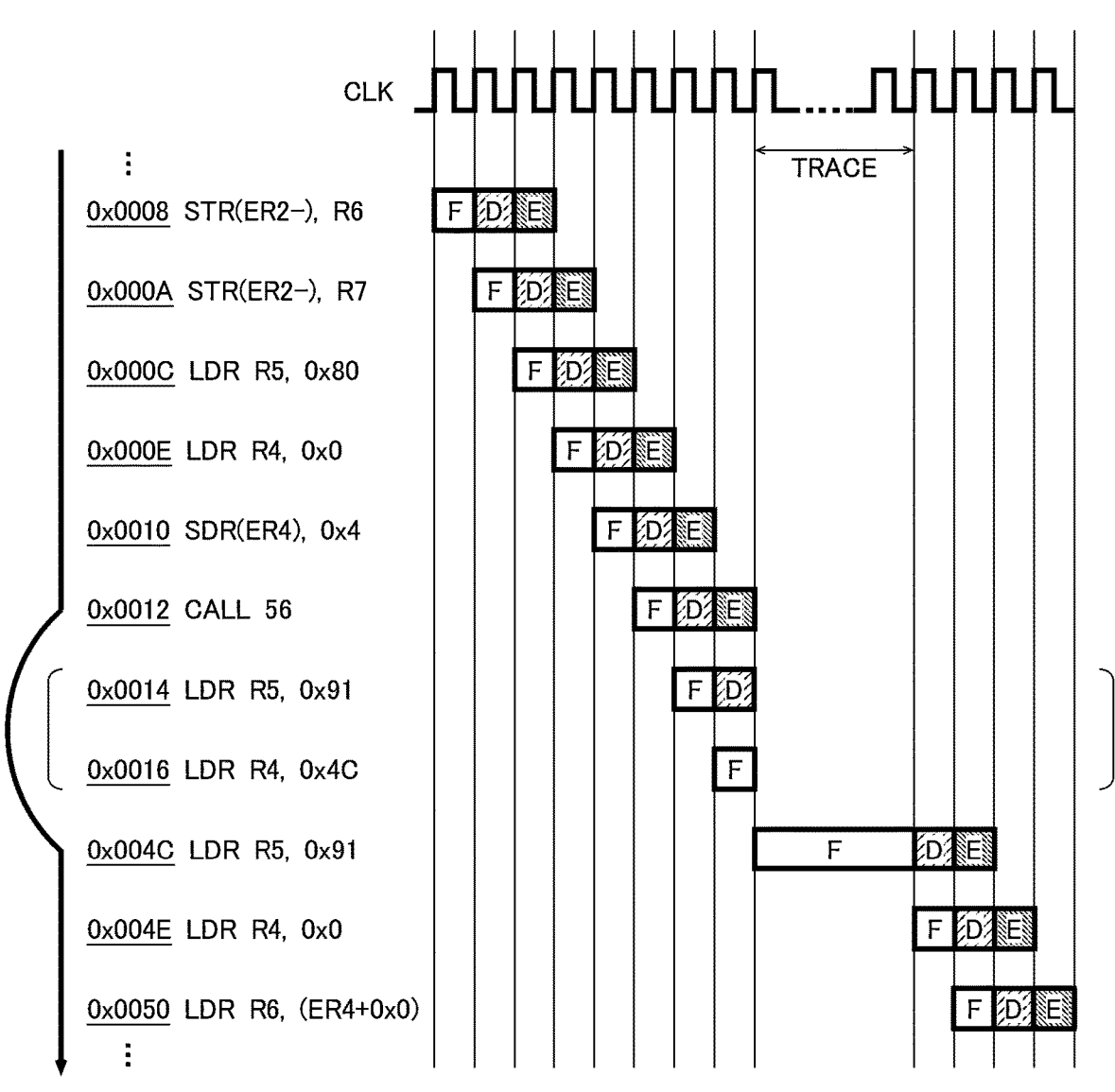
FIG. 9 is a diagram showing a result of execution of program code.

FIG. 9 is a diagram showing the result of execution of the program code (FIG. 7). As shown there, the CPU 110 executes instruction codes from one address to another in the order . . . 0x0008 to 0x000A to 0x000C to 0x000E to 0x0010 to 0x0012 to 0x004C to 0x004E to 0x0050 . . . .

Meanwhile, the emulated PC definitive value "dump_pc" changes from one value to another, as shown in FIG. 6, in the order . . . 0x0008 to 0x000A to 0x000C to 0x000E to 0x0010 to 0x0012 to 0x004C to 0x004E to 0x0050 to . . . . That is, the emulated PC definitive value "dump_pc" obtained in the tracer 200 completely coincides with the result of execution of the above-mentioned program code.

Thus, with the tracing system X described above, it is possible to completely grasp the program operation of the CPU 110.

MODIFICATIONS

The various technical features disclosed herein may be implemented in any manners other than in the embodiments described above, and allow for many modifications without departure from the spirit of their technical ingenuity. That is, the embodiments described above should be understood to be in every aspect illustrative and not restrictive, and the technical scope of the present invention is defined not by the description of the embodiments given above but by the appended claims and encompasses any modifications within a scope and sense equivalent to those claims.

INDUSTRIAL APPLICABILITY

The invention disclosed herein is useful, for example, in the debugging of microprocessors incorporated in a variety of information processing devices (smartphones, game machines, and car navigation systems).

REFERENCE SIGNS LIST

100 LSI (semiconductor device)
110 CPU (microprocessor)
111 state machine
112 decoder-executer
113 incrementer
114 branch destination address storage
115 selector
116 program counter
117 program memory
120 tracing circuit
121 status generator
122 counter
123 selector
200 tracer
201 decoder
202 incrementer
203 selector
204 emulated program counter
205 latch
206 trace memory
300 host
310 tracing program
X tracing system

The invention claimed is:

1. A tracing circuit for use with a microprocessor having an m-bit (where 2≤m) program counter, the tracing circuit externally outputting tracing data synchronously with a tracing clock,
the tracing circuit being configured to change an output value of the externally output tracing data according to operation of the program counter,
the tracing circuit being configured to include:
a status generator configured to generate a status signal that
has a first output value when the program counter remains unchanged,
has a second output value when the program counter is incremented, and
has a third output value when the program counter is loaded;
a counter configured
to start operating when the status signal turns to the third output value and to stop operating when a split-output period for a branch destination address or interrupt destination address expires; and
a selector configured
to select the status signal as the tracing data when the counter is not operating and
to select part of the branch destination address or interrupt destination address as the tracing data when the counter is operating.

2. The tracing circuit according to claim 1, wherein the tracing data is configured to have n bits (where 2≤n≤m).

3. The tracing circuit according to claim 1, wherein when the program counter remains unchanged, synchronously with the tracing clock, the tracing data is set to the first output value,
when the program counter is incremented, synchronously with the tracing clock, the tracing data is set to the second output value, and
when the program counter is loaded, synchronously with the tracing clock, the tracing data is set to the third output value and, with a state machine in the microprocessor temporarily suspended, the branch destination address or interrupt destination address loaded in the program counter is split-output as the tracing data.

4. A semiconductor device comprising:
the tracing circuit according to claim 1; and
the microprocessor.

5. The semiconductor device according to claim 4, wherein
the microprocessor is configured
to read an instruction code from a program memory by using an output value of the program counter as a read address and
to decode and execute the instruction code.

6. A tracer configured to receive the tracing clock and the tracing data from the semiconductor device according to claim 4 to monitor the tracing data and output a tracing result.

7. A tracer configured to receive, from a semiconductor device configured to include the tracing circuit according to claim 1 and the microprocessor, the tracing clock and the tracing data to monitor the tracing data and output a tracing result, the tracer comprising:
an emulated program counter;
a decoder configured,
when the tracing data is the first output value, to keep the emulated program counter unchanged,
when the tracing data is the second output value, to increment the emulated program counter, and
when the tracing data is the third output value, to load the emulated program counter sequentially with the branch destination address or interrupt destination address that is subsequently split-input;
a latch configured to acquire as a definitive value an output value of the emulated program counter synchronously with the tracing clock except during a split-input period for the branch destination address or interrupt destination address; and
a trace memory configured to store as the tracing result the definitive value that is sequentially acquired by the latch.

8. A tracing system comprising:
the semiconductor device according to claim 4;
the tracer according to claim 6; and
a host configured to display, store, and analyze the tracing result.

9. A tracing method comprising:

a first step of, when tracing operation is started, checking whether a program counter has been incremented;

a second step of, if the first step yields a negative result, checking whether the program counter has been changed;

a third step of, if the second step yields a negative result, setting tracing data to a first output value;

a fourth step of, if the first step yields a positive result, setting the tracing data to a second output value;

a fifth step of, if the second step yields a positive result, setting the tracing data to a third output value;

a sixth step of starting pulse counting operation for a tracing clock by use of a counter and bringing a state machine into a temporarily suspended state;

a seventh step of split-outputting, as the tracing data, part of a branch destination address or interrupt destination address synchronously with the tracing clock;

an eighth step of checking whether a count value of the counter has reached a predetermined value; and a ninth step of, if the eighth step yields a positive result, resetting the count value of the counter to zero, restoring the state machine from the temporarily suspended state, and returning control to the first step, wherein, if the eighth step yields a negative result, control is returned to the seventh step to repeat a sequence of operation.

10. A tracing method comprising:

a first step of, when tracing operation is started, initializing an output value of an emulated program counter;

a second step of checking whether input tracing data is a second output value;

a third step of, if the second step yields a negative result, checking whether the input tracing data is a third output value;

a fourth step of, if the third step yields a negative result, determining that the input tracing data is a first output value and returning control to the second step;

a fifth step of, if the second step yields a positive result, incrementing the emulated program counter and returning control to the second step;

a sixth step of, if the third step yields a positive result, storing part of a branch destination address or interrupt destination address, which is split-input as the tracing data, in corresponding bits in the emulated program counter;

a seventh step of checking whether all bit values of the branch destination address or interrupt destination address have been stored in the emulated program counter; and an eighth step of, if the seventh step yields a positive result, determining an output value of the emulated program counter as a definitive value of the emulated program counter and returning control to the second step, wherein, if the seventh step yields a negative result, control is returned to the sixth step to continue to split-input the branch destination address or interrupt destination address to repeat a sequence of operation.

* * * * *